US011197301B2

(12) United States Patent
Lin (10) Patent No.: US 11,197,301 B2
(45) Date of Patent: Dec. 7, 2021

(54) TRANSMISSION METHOD AND APPARATUS (71) Applicant: GUANGDONG OPPO MOBILE TELECOMMUNICATIONS CORP., LTD., Guangdong (CN)

(72) Inventor: Yanan Lin, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 138 days.

(21) Appl. No.: 16/439,844

(22) Filed: Jun. 13, 2019

(65) Prior Publication Data

US 2019/0357226 A1 Nov. 21, 2019

Related U.S. Application Data (63) Continuation of application No. PCT/CN2016/109951, filed on Dec. 14, 2016.

(51) Int. Cl.
*H04W 72/08* (2009.01)
*H04W 72/04* (2009.01)
(Continued)

(52) U.S. Cl.
CPC ......... *H04W 72/085* (2013.01); *H04L 1/0061* (2013.01); *H04L 1/1812* (2013.01);
(Continued)

(58) Field of Classification Search
CPC . H04W 72/085; H04W 76/27; H04W 52/367; H04W 72/042; H04W 72/1289;
(Continued)

(56) References Cited

U.S. PATENT DOCUMENTS

2011/0170495 A1* 7/2011 Earnshaw ............... H04L 5/001
370/329
2011/0319120 A1* 12/2011 Chen ................... H04W 52/367
455/522

(Continued)

FOREIGN PATENT DOCUMENTS

| CN | 1571573 | 1/2005 |
| CN | 1835625 | 9/2006 |

(Continued)

OTHER PUBLICATIONS

EPO, Office Action for EP Application No. 16924208.8, dated Nov. 4, 2019.

(Continued)

*Primary Examiner* — Hoang-Chuong Q Vu
(74) *Attorney, Agent, or Firm* — Hodgson Russ LLP (57) ABSTRACT A transmission method and a transmission device are provided to satisfy different transmission demands in limited conditions of system resources. The transmission method includes: determining a channel priority of a first channel by a terminal device; determining a transmission scheme of the first channel by the terminal device according to the channel priority of the first channel; and performing a transmission of the first channel by the terminal device using the determined transmission scheme.

20 Claims, 3 Drawing Sheets (51) Int. Cl.
*H04L 29/08* (2006.01)
*H04L 5/00* (2006.01)
*H04L 1/00* (2006.01)
*H04L 1/18* (2006.01)
*H04W 72/12* (2009.01)
*H04W 76/27* (2018.01)
*H04W 52/36* (2009.01)
*H04L 27/26* (2006.01)

(52) U.S. Cl.
CPC .......... *H04L 5/0048* (2013.01); *H04L 5/0055* (2013.01); *H04L 69/324* (2013.01); *H04W 52/367* (2013.01); *H04W 72/042* (2013.01); *H04W 72/1289* (2013.01); *H04W 76/27* (2018.02); *H04L 27/2601* (2013.01)

(58) Field of Classification Search
CPC .... H04W 72/02; H04L 1/0061; H04L 1/1812; H04L 5/0048; H04L 5/0055; H04L 69/324; H04L 27/2601
See application file for complete search history.

(56) References Cited

U.S. PATENT DOCUMENTS

| | | | |
|---|---|---|---|
| 2012/0170479 A1* | 7/2012 | Ren | H04L 5/0055 370/252 |
| 2014/0056278 A1* | 2/2014 | Marinier | H04W 72/1268 370/330 |
| 2014/0295909 A1* | 10/2014 | Ouchi | H04W 52/40 455/522 |
| 2014/0376461 A1* | 12/2014 | Park | H04L 1/0061 370/329 |
| 2015/0055454 A1* | 2/2015 | Yang | H04W 52/146 370/230 |
| 2015/0222402 A1* | 8/2015 | Ouchi | H04W 72/0413 370/329 |
| 2016/0227536 A1* | 8/2016 | Khawer | H04W 72/1215 |
| 2017/0223694 A1* | 8/2017 | Han | H04W 72/1284 |
| 2017/0303289 A1 | 10/2017 | Guo et al. | |
| 2018/0123744 A1* | 5/2018 | Nogami | H04L 1/1854 |
| 2018/0206214 A1* | 7/2018 | Bendlin | H04W 72/042 |
| 2018/0279283 A1* | 9/2018 | Takeda | H04W 72/044 |
| 2019/0223204 A1* | 7/2019 | Kim | H04B 1/00 |

FOREIGN PATENT DOCUMENTS

| | | |
|---|---|---|
| CN | 101364856 | 2/2009 |
| CN | 102123512 | 7/2011 |
| CN | 103200663 | 7/2013 |
| CN | 103262604 | 8/2013 |
| CN | 103491042 | 1/2014 |
| CN | 104205922 | 12/2014 |
| CN | 104936300 | 9/2015 |
| EP | 2343946 | 7/2011 |
| EP | 2793514 | 10/2014 |
| JP | 2011142638 A | 7/2011 |
| WO | 2011120469 | 10/2011 |
| WO | 2016048597 | 3/2016 |

OTHER PUBLICATIONS

SIPO, First Office Action for CN Application No. 201680091500.8, dated Mar. 16, 2020.
SIPO, Second Office Action for CN Application No. 201680091500.8, dated Jun. 2, 2020.
SIPO, Third Office Action for CN Application No. 201680091500.8, dated Aug. 20, 2020.
3GPP, "Way Forward—Multiplexing URLLC and eMBB", 3GPP TSG RAN WG1 #87, R1-1613161, USA, Nov. 14, 2016.
3GPP, "WF on Multiplexing eMBB and URLLC in DL", 3GPP TSG RAN WG1 #87, R1-1613657, USA, Nov. 14, 2016.
WIPO, ISR for PCT/CN2016/109951, dated Jun. 28, 2017.
JPO, First Office Action for JP2019531658, dated Nov. 27, 2020.
IP India, First Office Action for IN 201917027322, dated Jan. 11, 2021.
TIPO, Office Action for TW Application No. 106141984, dated Feb. 25, 2021.
TIPO, Office Action for TW Application No. 106141984, dated Aug. 12, 2021.
JPO, Office Action for JP Application No. 2019-531658, dated Aug. 13, 2021.
EPO, Communication for EP Application No. 16924208.8, dated Aug. 30, 2021.

* cited by examiner

TRANSMISSION METHOD AND APPARATUS

CROSS REFERENCE

This application is a continuation of International Application No. PCT/CN2016/109951, filed Dec. 14, 2016, the entire disclosure of which is incorporated herein by reference.

TECHNICAL FIELD

Embodiments of the present disclosure relate to the field of communication, and particularly to a transmission method and a transmission device.

BACKGROUND

With the development of wireless communication technology, a wireless communication system needs to support multiple business types, for example, enhanced Mobile BroadBand (eMBB) business, Super Reliable Low Latency (URLLC) business, Massive Machine Type Communication (mMTC) business and the like. Different business types have different demands on time delay, reliability, throughput capacity and the like, and how to satisfy demands from different businesses under limited system resource is a research hotspot of the present field.

SUMMARY

Embodiments of the present disclosure provide a transmission method and a transmission device, which can satisfy different transmission demands under limited system resources.

In a first aspect, a transmission method is provided, including: determining a channel priority of a first channel by a terminal device; determining a transmission scheme of the first channel by the terminal device according to the channel priority of the first channel; and performing a transmission of the first channel by the terminal device using the determined transmission scheme.

Optionally, the first channel can be an uplink channel or a downlink channel. The first channel can be a data channel or a control channel.

In the transmission method provided by the embodiments of the present disclosure, the network device determines the channel priority of the first channel and sends the indication information configured to indicate the channel priority of the first channel to the terminal device; the terminal device and the network device can determine the transmission scheme of the first channel according to the channel priority of the first channel and perform the transmission of the first channel by using the determined transmission scheme, which facilitates transmitting different channels having different channel priorities by using different transmission schemes, so as to satisfy different transmission demands under limited system resource.

Furthermore, the terminal device can be aware of the channel priority of the channel to be transmitted currently, so as to transmit the channel by using a corresponding transmission parameter of physical layer, and hence to satisfy the demands from the business corresponding to the channel priority, such as time delay, reliability and throughput, as far as possible.

In a first possible implementation of the first aspect, the first channel is a data channel; determining a channel priority of a first channel by a terminal device includes: determining the channel priority of the first channel by the terminal device according to downlink control information (DCI) sent from a network device, wherein the DCI is configured to schedule the transmission of the first channel.

Optionally, the terminal device can also determine the channel priority of the first channel according to wireless resource control (RRC) signaling sent from the network device.

In a second possible implementation of the first aspect in combination with the foregoing possible implementation of the first aspect, determining the channel priority of the first channel by the terminal device according to DCI sent from a network device includes: determining the channel priority of the first channel by the terminal device according to priority indication information contained in the DCI, wherein the priority indication information is used to indicate the channel priority of the first channel; or, determining the channel priority of the first channel by the terminal device according to a DCI format of the DCI; or, determining the channel priority of the first channel by the terminal device according to a scrambling sequence of a cyclic redundancy check (CRC) code of the DCI; or determining the channel priority of the first channel by the terminal device according to a control channel resource occupied by the DCI; or determining the channel priority of the first channel by the terminal device according to transmission timing indication information contained in the DCI, wherein the transmission timing indication information is used to indicate: a time interval between the DCI and the first channel, and/or, a hybrid automatic repeat request (HARQ) sequence between the first channel and an acknowledgement (ACK)/non-acknowledgement (NACK) feedback corresponding to the first channel; or, determining the channel priority of the first channel by the terminal device according to transmission duration indication information contained in the DCI, wherein the transmission duration indication information is used to indicate a length of time domain resource occupied by the first channel.

In a third possible implementation of the first aspect in conjunction with the foregoing possible implementation of the first aspect, if the first channel is an uplink channel, then the transmission scheme of the first channel includes a transmission power of the first channel; determining a transmission scheme of the first channel by the terminal device according to the channel priority of the first channel includes: determining a target transmission power of the first channel by the terminal device according to the channel priority of the first channel if the terminal device needs to transmit the first channel at the same time when transmitting a second channel to a network device and if a sum of current transmission powers of the first channel and the second channel is larger than a maximum transmission power of the terminal device, wherein the target transmission power of the first channel is smaller than or equal to the current transmission power of the first channel.

In an exemplary embodiment, when the sum of transmission powers of the first channel and other channel(s) transmitted at the same time by the terminal device is larger than the maximum transmission power of the terminal device, the terminal device can determine whether to reduce the transmission power of the first channel according to the channel priority of the first channel.

In a fourth possible implementation of the first aspect in conjunction with the foregoing possible implementation of the first aspect, if the first channel is an uplink channel, then the transmission scheme of the first channel includes a transmission power of the first channel; determining a transmission scheme of the first channel by the terminal device according to the channel priority of the first channel includes: determining a maximum permitted transmission power or a power boosting value of the first channel by the terminal device according to the channel priority of the first channel; and determining the transmission power of the first channel by the terminal device according to the maximum permitted transmission power or the power boosting value of the first channel.

In a fifth possible implementation of the first aspect in conjunction with the foregoing possible implementation of the first aspect, determining a transmission scheme of the first channel by the terminal device according to the channel priority of the first channel includes: determining whether to transmit the first channel on a physical resource of the first channel according to the channel priority of the first channel in case that the first channel is an uplink channel and the physical resource of the first channel is conflicted with a physical resource of a third channel of the terminal device.

Optionally, if the channel priority of the first channel is not lower than the channel priority of the third channel, then the terminal device can have priority of transmitting the first channel on the conflicted physical resource.

Optionally, if the channel priority of the first channel is lower than the channel priority of the third channel, then the terminal device can discard the information carried by the first channel on the conflicted physical resource or can perform a rate matching to the first channel.

In a sixth possible implementation of the first aspect in conjunction with the foregoing possible implementation of the first aspect, determining a transmission scheme of the first channel by the terminal device according to the channel priority of the first channel includes: determining, by the terminal device, a modulation and coding scheme (MCS) indicated by MSC indication information contained in DCI according to the channel priority of the first channel if the first channel is a data channel, wherein the DCI is configured to schedule the transmission of the first channel.

In a seventh possible implementation of the first aspect in conjunction with the foregoing possible implementation of the first aspect, if the first channel is a downlink data channel, then the transmission method further includes: determining, by the terminal device, at least one of a transmission priority and a transmission scheme for an ACK/NACK feedback of the first channel according to the channel priority of the first channel.

In an eighth possible implementation of the first aspect in conjunction with the foregoing possible implementation of the first aspect, before determining a transmission scheme of the first channel by the terminal device according to the channel priority of the first channel, the transmission method further includes: receiving, by the terminal device, a wireless resource control (RRC) signaling sent from a network device, wherein the RRC signaling is configured to indicate a correspondence between at least one predetermined channel priority and a transmission scheme; determining a transmission scheme of the first channel by the terminal device according to the channel priority of the first channel includes: determining the transmission scheme of the first channel by the terminal device according to the correspondence and the channel priority of the first channel.

In a second aspect, another transmission method is provided, including: determining a channel priority of a first channel by a network device according to at least one of a business type and a transmission performance requirement of information carried on the first channel; and sending indication information to a terminal device by the network device, wherein the indication information is used to indicate the channel priority of the first channel.

Optionally, the network device can send RRC signaling to the terminal device, and the RRC signaling carries the indication information.

In a first possible implementation of the second aspect, the first channel is a data channel; sending indication information to a terminal device by the network device includes: sending downlink control information (DCI) to the terminal device by the network device, wherein the DCI is configured to schedule a transmission of the first channel.

In a second possible implementation of the second aspect in combination with the foregoing possible implementation of the second aspect, the DCI includes priority indication information configured to indicate the channel priority of the first channel.

Herein, optionally, the DCI can be newly added with at least one bit configured to carry the priority indication information. Or, an original, reserved bit in the DCI can be used for carrying the priority indication information.

In a third possible implementation of the second aspect in combination with the foregoing possible implementation of the second aspect, before sending indication information to a terminal device by the network device, the transmission method further includes: determining a DCI format corresponding to the channel priority of the first channel by the network device; sending DCI to the terminal device by the network device includes: sending the DCI by the network device using the corresponding DCI format.

Optionally, the channel priority of the first channel scheduled by the DCI can be indicated by the DCI format.

In a fourth possible implementation of the second aspect in combination with the foregoing possible implementation of the second aspect, before sending DCI to the terminal device by the network device, the transmission method further includes: determining a scrambling sequence corresponding to the channel priority of the first channel by the network device; and performing a scrambling process to a cyclic redundancy check (CRC) code of the DCI by the network device using the corresponding scrambling sequence.

Optionally, the channel priority of the first channel scheduled by the DCI can be indicated by the scrambling sequence of the CRC of the DCI.

In a fifth possible implementation of the second aspect in combination with the foregoing possible implementation of the second aspect, before sending DCI to the terminal device by the network device, the transmission method further includes: determining a control channel resource corresponding to the channel priority of the first channel by the network device; sending DCI to the terminal device by the network device includes: sending the DCI to the terminal device on the corresponding control channel resource by the network device.

Optionally, the channel priority of the first channel scheduled by the DCI can be indicated by the control channel resource occupied by the DCI.

In a sixth possible implementation of the second aspect in combination with the foregoing possible implementation of the second aspect, before sending DCI to the terminal device by the network device, the transmission method further includes: determining a transmission timing corresponding to the channel priority of the first channel by the network device, wherein the transmission timing corresponding to the first channel includes at least one of: a time interval between the DCI and the first channel; and a hybrid automatic repeat request (HARQ) sequence between the first channel and an acknowledgement (ACK)/non-acknowledgement (NACK) feedback corresponding to the first channel; the DCI includes transmission timing indication information configured to indicate the transmission timing.

In a seventh possible implementation of the second aspect in combination with the foregoing possible implementation of the second aspect, before sending DCI to the terminal device by the network device, the transmission method further includes: determining a transmission duration corresponding to the channel priority of the first channel by the network device; the DCI includes transmission duration indication information configured to indicate the transmission duration.

In an eighth possible implementation of the second aspect in combination with the foregoing possible implementation of the second aspect, the transmission method further includes: determining a transmission scheme of the first channel by the network device according to the channel priority of the first channel; and performing a transmission of the first channel by the network device using the determined transmission scheme.

In some aspect of the present disclosure, optionally, the transmission scheme of the first channel includes at least one of: a channel coding scheme of the first channel; a transmission duration of the first channel; a multi-access scheme of the first channel; a modulation and coding scheme (MCS) of the first channel, a retransmission scheme of the first channel, a transmission power of the first channel; a demodulation reference signal (DMRS) pattern of the first channel; a precoding scheme of the first channel; a hypothetic multiplexing mode of the first channel; a resource conflict processing mode of the first channel; a transmission periodicity of the first channel; an information storage scheme of the first channel under decoding failure; a transmission format of uplink control information in the first channel; a transmission timing of the first channel; and a cyclic prefix (CP) type of the first channel.

In a third aspect, a transmission device is provided which is configured to perform the transmission method of the foregoing first aspect or in any possible implementation of the first aspect. In an exemplary embodiment, the transmission device includes units configured to perform the transmission method of the foregoing first aspect or in any possible implementation of the first aspect.

In a fourth aspect, a transmission device is provided which is configured to perform the transmission method of the foregoing second aspect or in any possible implementation of the second aspect. In an exemplary embodiment, the transmission device includes units configured to perform the transmission method of the foregoing second aspect or in any possible implementation of the second aspect.

In a fifth aspect, a transmission device is provided, including a storage unit and a processor; the storage unit is configured to store an instruction; the processor is configured to perform the instruction stored in the storage unit; and when the processor performs the instruction stored in the storage unit, it causes the processor to perform the transmission method of the foregoing first aspect or in any possible implementation of the first aspect.

In a sixth aspect, a transmission device is provided, including a storage unit and a processor; the storage unit is configured to store an instruction; the processor is configured to perform the instruction stored in the storage unit; and when the processor performs the instruction stored in the storage unit, it causes the processor to perform the transmission method of the foregoing second aspect or in any possible implementation of the second aspect.

In a seventh aspect, a computer readable medium is provided which is configured to store a computer program, and the computer program includes an instruction configured to perform the transmission method of the foregoing first aspect or in any possible implementation of the first aspect.

In an eighth aspect, a computer readable medium is provided which is configured to store a computer program, and the computer program includes an instruction configured to perform the transmission method of the foregoing second aspect or in any possible implementation of the second aspect.

DETAILED DESCRIPTION

Hereinafter, technical solutions according to the embodiments of the present invention will be described as below in conjunction with the accompanying drawings of embodiments of the present invention.

The technical solutions according to the embodiments of the present invention can be applied in various types of communication systems, for example, Global System of Mobile communication (GSM), Code Division Multiple Access (CDMA) system, Wideband Code Division Multiple Access (WCDMA) system, General Packet Radio Service (GPRS) system, Long Term Evolution (LTE) system, LTE Frequency Division Duplex (FDD) system, LTE Time Division Duplex (TDD) system, Universal Mobile Telecommunication System (UMTS), Worldwide Interoperability for Microwave Access (WiMAX) communication system, Future Evolution Public Land Mobile Network (PLMN) or future 5G system, and the like.

Figure 1:
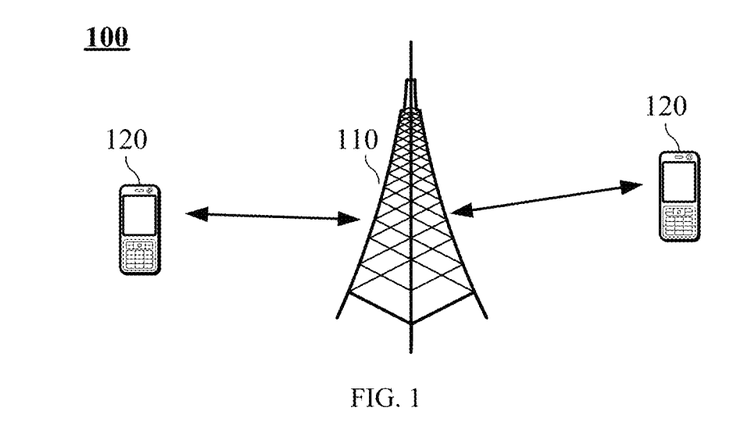
FIG. 1 is an architecture diagram illustrating a wireless communication system applied in an embodiment of the present disclosure.

FIG. 1 illustrates a wireless communication system 100 applied in an embodiment of the present disclosure. The wireless communication system 100 can include at least one network device 110. The network device 110 can be a device communicated with a terminal device. Each network device 110 can provide a specific geographic area with communication coverage, and can be communicated with a terminal device (e.g., UE) located in the covered area. The network device 110 can be a base transceiver station (BTS) in GSM system or CDMA system, and can also be a NodeB (NB) in WCDMA system, and can also be an Evolutional Node B (eNB or eNodeB) in LTE system, or can be a wireless controller in Cloud Radio Access Network (CRAN), or the network device can be a relay station, an access point, a vehicle-mounted device, a wearable device, a network side device in future 5G network or a network device in Future Evolution PLMN and the like.

The wireless communication system 100 further includes a plurality of terminal devices 120 located in a coverage area of the network device 110. The terminal device 120 can be movable or fixed. The terminal device 120 can refer to an access terminal, a user equipment (UE), a subscriber unit, a subscriber station, a mobile radio station, a mobile station, a remote station, a remote terminal, a mobile device, a subscriber terminal, a terminal, a wireless communication device, a user agent or a user device. The access terminal can be a cell phone, a cordless telephone, a Session Initiation Protocol (SIP) telephone, a Wireless Local Loop (WLL) station, a Personal Digital Assistant (PDA), a handheld device with wireless communication function, a computing device or other processing devices connected to a wireless modem, a vehicle-mounted device, a wearable device, a terminal device in future 5G network or a terminal device in Future Evolution PLMN, and the like.

FIG. 1 illustrates one network device and two terminal devices. Optionally, the wireless communication system 100 can include a plurality of network devices, and a coverage area of each of the network devices can include other numbers of terminal devices without particularly limited in the embodiments of the present disclosure.

Optionally, the wireless communication system 100 can further include other network entities such as network controller and mobile management entity without particularly limited in the embodiments of the present disclosure.

Figure 2:
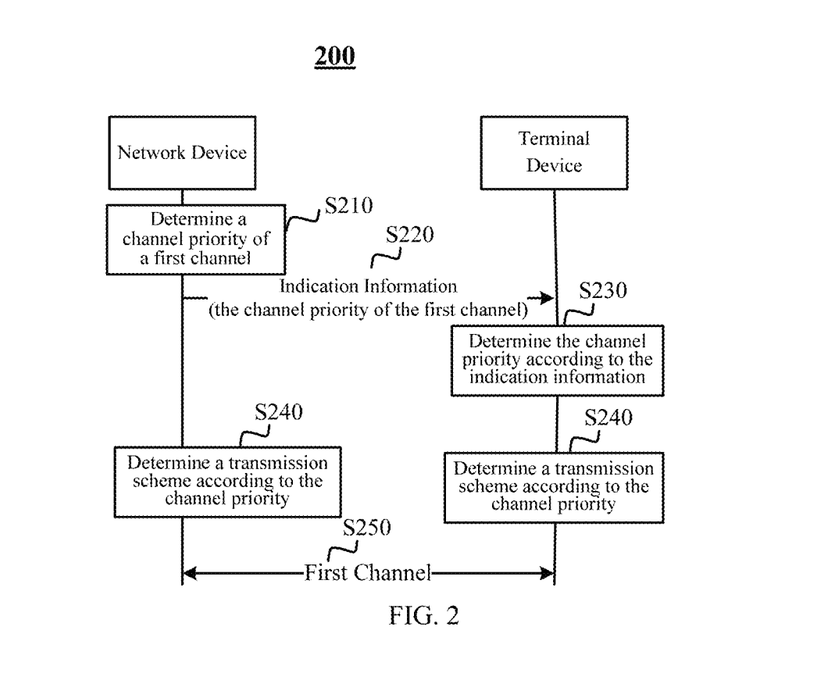
FIG. 2 is a flow chart illustrating a transmission method provided by an embodiment of the present disclosure.

FIG. 2 illustrates a transmission method 200 provided by an embodiment of the present disclosure. The transmission method 200 can be applied in the wireless communication system 100 illustrated in FIG. 1 without limiting the embodiments of the present disclosure thereto.

In S210, a channel priority of a first channel is determined by a terminal device.

In the embodiments of the present disclosure, there can be two channel priorities upon partition, e.g., channel priority 0 and channel priority 1, and different channel priorities can be corresponding to different transmission schemes. When a particular channel is transmitted, a channel priority of the channel can be determined from the at least two channel priorities, and the channel can be transmitted by using a transmission scheme corresponding to the determined channel priority, so as to satisfy the demands of different channels and meanwhile optimizing performances such as system resource utilization.

Optionally, at least one of a partition of the channel priority and a correspondence between the channel priority and the transmission scheme can be regulated in a protocol or can be configured by the network device without particularly limited in the embodiments of the present disclosure.

In the embodiments of the present disclosure, the first channel can be an uplink channel or a downlink channel. The first channel can be a data channel or a control channel. For example, the first channel can be an uplink data channel carried with uplink control information (UCI) without limiting the embodiments of the present disclosure thereto.

The network device can determine the channel priority of the first channel by various ways. As an optional embodiment, the network device can determine the channel priority of the first channel according to a business type and/or a transmission performance requirement of information carried on the first channel. Optionally, the transmission performance requirement can include Quality of Service (Qos), but the way of determining the channel priority of the first channel by the network device is not particularly limited in the embodiments of the present disclosure.

It should be understood that, the term "information" in the present disclosure can refer to data, and can also refer to signal, unless otherwise defined particularly in the context. The present disclosure is not intended to limit the particular meaning of the term "information".

In S220, indication information is sent to a terminal device by the network device, wherein the indication information is used to indicate the channel priority of the first channel.

As an optional embodiment, the network device can notify the channel priority of the first channel by sending a high-level signaling to the terminal device. For example, the network device can send a Radio Resource Control (RRC) signaling to the terminal device, the RRC signaling is configured to indicate the channel priority of the first channel. Optionally, if the first channel is a control channel, then the network device can indicate the channel priority of the first channel in a RRC signaling carried with resource allocation information of the first channel so as to save signaling overheads, but the embodiments of the present disclosure are not limited thereto.

As another optional embodiment, if the first channel is a data channel, then the network device can notify the channel priority of the first channel by sending Downlink Control Information (DCI) configured to schedule the transmission of the first channel to the terminal device. If the first channel is an uplink data channel, then the DCI is an Uplink Grant, but the embodiments of the present disclosure are not limited thereto.

Optionally, the network device can also inform the terminal device of the channel priority of the first channel by other ways without particularly limited in the embodiments of the present disclosure.

In S230, the indication information sent from the network device is received, and the channel priority of the first channel is determined according to the indication information, by the terminal device.

In the embodiments of the present disclosure, the network device can visibly or impliedly indicate the channel priority of the first channel through the DCI.

As an optional embodiment, the DCI can include priority indication information configured to indicate the channel priority of the first channel. For example, there can be two channel priorities upon partition, and in such a case the DCI can include 1 bit of priority indication information; or, there can be four channel priorities upon partition, and in such a case the DCI can include 2 bits of priority indication information, but the embodiments of the present disclosure are not limited thereto.

As another optional embodiment, different channel priorities can be impliedly indicated by using different DCI formats. In such a case, the network device can determine a DCI format corresponding to the channel priority of the first channel according to a correspondence between the channel priority and the DCI format, and send the DCI with the corresponding DCI format to the terminal device.

Optionally, in the embodiments of the present disclosure, the channel priority can be in one-to-one correspondence with the DCI format; or, one channel priority can be corresponding to a DCI format set consisted of at least two DCI formats; in such a case, the network device can determine a target DCI format used by the DCI configured to schedule the transmission of the first channel from the DCI format set corresponding to the channel priority of the first channel without particularly limited in the embodiments of the present disclosure.

At this moment, the terminal device can obtain a DCI format currently used by the network device by blindly detecting different DCI formats, and determine the channel priority of the first channel scheduled by the received DCI according to the currently used DCI format and the correspondence between the DCI format and the channel priority, but the embodiments of the present disclosure are not limited thereto.

Optionally, the correspondence between the channel priority and the DCI format can be defined in a protocol. Or, the correspondence between the channel priority and the DCI format can be preconfigured by the network device; in such a case, optionally, the network device can further send indication information configured to indicate the correspondence to the terminal device, but the embodiments of the present disclosure are not limited thereto.

As another optional embodiment, different channel priorities can be impliedly indicated by using different Cyclic Redundancy Check (CRC) scrambling sequences. In such a case, the network device can determine a CRC scrambling sequence corresponding to the channel priority of the first channel according to a correspondence between the channel priority and the CRC scrambling sequence, and perform a scrambling process to a CRC of the DCI sent to the terminal device by using the corresponding CRC scrambling sequence.

Optionally, in the embodiments of the present disclosure, the channel priority can be in one-to-one correspondence with the CRC scrambling sequence; or, one channel priority can be corresponding to a CRC scrambling sequence set consisted of at least two CRC scrambling sequences; in such a case, the network device can determine a target CRC scrambling sequence used by the DCI configured to schedule the transmission of the first channel from the CRC scrambling sequence set corresponding to the channel priority of the first channel, without particularly limited in the embodiments of the present disclosure.

In such a case, upon receiving DCI sent from the network device, the terminal device can determine the channel priority of the first channel scheduled by the DCI according to the CRC scrambling sequence of the DCI and the correspondence between the CRC scrambling sequence and the channel priority, but the embodiments of the present disclosure are not limited thereto.

Optionally, the correspondence between the channel priority and the CRC scrambling sequence can be defined in a protocol. Or, the correspondence between the channel priority and the CRC scrambling sequence can be preconfigured by the network device; in such a case, optionally, the network device can further send indication information configured to indicate the correspondence to the terminal device, but the embodiments of the present disclosure are not limited thereto.

As another optional embodiment, different channel priorities can be indicated by sending DCI on different control channel resources. The control channel resource herein can refer to logical resource, for example, Control Channel Element (CCE) or control channel search space; and can also refer to physical resource, for example, sub-band occupied by the control channel or Physical Resource Block (PRB) and the like, without particularly limited in the embodiments of the present disclosure.

In an exemplary embodiment, different channel priorities can be corresponding to different control channel resource sets. In such a case, the network device can determine a control channel resource set corresponding to the channel priority of the first channel according to a correspondence between the control channel resource set and the channel priority, determine a target control channel resource of the DCI configured to schedule the transmission of the first channel from the corresponding control channel resource set, and send the DCI to the terminal device on the target control channel resource, but the embodiments of the present disclosure are not limited thereto.

In such a case, the terminal device can perform a blind detection on different control channel resources, and upon detecting DCI sent from the network device, determine the channel priority of the first channel scheduled by the DCI according to the control channel resource occupied by the detected DCI, but the embodiments of the present disclosure are not limited thereto.

Optionally, the correspondence between the channel priority and the control channel resource can be defined in a protocol. Or, the correspondence between the channel priority and the control channel resource can be preconfigured by the network device; in such a case, optionally, the network device can further send indication information configured to indicate the correspondence to the terminal device, but the embodiments of the present disclosure are not limited thereto.

As another optional embodiment, different channel priorities can be configured with different transmission duration ranges, for example, a transmission of a channel with higher priority can occupy more time domain resources, but the embodiments of the present disclosure are not limited thereto. At this moment, the network device can determine a transmission duration range corresponding to the channel priority of the first channel according to a correspondence between the channel priority and the transmission duration range, and determine target transmission duration of the first channel from the transmission duration range. Subsequently, the network device can send DCI containing transmission duration indication information to the terminal device, where the transmission duration indication information is used to indicate the target transmission duration; for example, the transmission duration indication information is used to indicate the number of Orthogonal Frequency Division Multiplexing (OFDM) symbols occupied by the first channel, but the embodiments of the present disclosure are not limited thereto. Correspondingly, upon receiving the DCI, the terminal device can determine the channel priority of the first channel according to the target transmission duration indicated by the transmission duration indication information in the DCI and the correspondence between the transmission duration range and the channel priority, but the embodiments of the present disclosure are not limited thereto.

Optionally, the correspondence between the channel priority and the transmission duration range can be defined in a protocol. Or, the correspondence between the channel priority and the transmission duration range can be preconfigured by the network device; in such a case, optionally, the network device can further send indication information configured to indicate the correspondence to the terminal device without limiting the embodiments of the present disclosure thereto.

As another optional embodiment, in the embodiments of the present disclosure, different channel priorities can be configured with different transmission timings. The transmission timing can include: a time interval between DCI and data channel transmission, and/or, a hybrid automatic repeat request (HARQ) sequence between the data channel transmission and an acknowledgement (ACK)/non-acknowledgement (NACK), without particularly limited in the embodiments of the present disclosure. In such a case, the network device can determine a transmission timing corresponding to the channel priority of the first channel, and can incorporate transmission timing indication information configured to indicate the corresponding transmission timing into the DCI configured to schedule the transmission of the first channel. Correspondingly, upon receiving the DCI, the terminal device can determine the transmission timing used in the transmission of the first channel scheduled by the DCI according to the transmission timing indication information contained in the DCI and determine the channel priority of the first channel according to the transmission timing, but the embodiments of the present disclosure are not limited thereto.

Optionally, transmission timings corresponding to different channel priorities can be defined in a protocol, or can be preconfigured by the network device; in such a case, optionally, the network device can further send indication information configured to indicate the transmission timings corresponding to different channel priorities, but the embodiments of the present disclosure are not limited thereto.

In S240, a transmission scheme of the first channel is determined according to the channel priority of the first channel by the terminal device and the network device.

In the embodiments of the present disclosure, different channel priorities can be configured with different transmission schemes; one channel priority can be corresponding to one or more transmission scheme, and each transmission scheme can include one or more transmission parameter, that is, each transmission scheme can be corresponding to one transmission parameter set. The transmission parameter set can include one or more of: a channel coding scheme, a multi-access scheme, a retransmission scheme, a demodulation reference signal (DMRS) pattern, a precoding scheme, a modulation and coding scheme (MCS), a length of time domain transmission unit, a transmission duration, a transmission timing, a cyclic prefix (CP) type and the like, without limiting the embodiments of the present disclosure thereto. The example listed in table 1 defines two types of channel priorities of channel priority 0 and channel priority 1, and configure each of the channel priorities with one corresponding transmission scheme, in which different transmission schemes corresponding to different transmission parameter sets, but the embodiments of the present disclosure are not limited thereto.

TABLE 1

Correspondence between Channel Priority and Transmission Scheme

| Channel Priority | Transmission Scheme |
|---|---|
| 0 | {channel coding scheme 1, transmission duration 1, HARQ sequence 1, . . .} |
| 1 | {channel coding scheme 2, transmission duration 2, HARQ sequence 2, . . .} |

Optionally, transmission schemes corresponding to different channel priorities can be predetermined by the network device with the terminal device, or can be notified to the terminal device by the network device through RRC signaling. That is, before S210, the transmission method 200 can further include: sending RRC signaling to the terminal device by the network device; the RRC signaling can be configured to indicate the correspondence between the channel priority and the transmission scheme. Correspondingly, upon receiving the RRC signaling, the terminal device can store the correspondence between the channel priority and the transmission scheme; and in a subsequent transmission of a particular channel, the terminal device can determine the transmission scheme used in the transmission of the particular channel according to the channel priority of the channel and the stored correspondence between the channel priority and the transmission scheme, but the embodiments of the present disclosure are not limited thereto.

As an optional embodiment, the transmission scheme of the first channel can include a channel coding scheme of the first channel. The channel coding scheme of the first channel can be Low Density Parity Check (LDPC) code, polar code, Tail-bit convolution code (TBCC) or Turbo coding, and the like, without particularly limited in the embodiments of the present disclosure.

In an exemplary embodiment, the terminal device can use different channel coding schemes for different channel priorities. For example, if the channel priority of the first channel is 0, then the terminal device can determine the channel coding scheme of the first channel as LDPC; if the channel priority of the first channel is 1, then the terminal device can determine the channel coding scheme of the first channel as Polar code. In this way, by using different channel coding schemes for different channel priorities, different transmission delays and transmission reliabilities can be obtained, so as to satisfy the demands from different business types.

As another optional embodiment, the transmission scheme of the first channel can include transmission duration of the first channel, that is, a length of time domain resource occupied by the first channel. Optionally, the length of time domain resource can refer to the number of OFDM symbol contained in the time domain resource, but the embodiments of the present disclosure are not limited thereto. For example, in case that the first channel is a data channel, when the channel priority of the first channel is 0, the terminal device can transmit the first channel by using time slot; when the channel priority of the first channel is 1, the terminal device can transmit the first channel by using mini-time slot, in which the length of the mini-time slot can be configured by the network side. In the embodiments of the present disclosure, optionally, the business type having higher requirements on transmission delay can be configured with higher channel priority and can be transmitted by using shorter time domain resource, while the business type having lower requirements on transmission delay can be configured with lower channel priority and can be transmitted by using longer time domain resource, so as to satisfy different demands.

As another optional embodiment, the transmission scheme of the first channel can include a multi-access scheme used by the first channel; for example, the multi-access scheme can include Discrete Fourier Transform Spread OFDM (DFT-S-OFDM) or Cyclic Prefix OFDM (CP-OFDM) or Single Carrier Frequency Division Multiple Access (SC-FDMA) or Orthogonal Frequency Division Multiple Access (OFDMA), or the like. Optionally, in the embodiments of the present disclosure, the channel having higher channel priority can use CP-OFDM, and the channel having lower channel priority can use DFT-S-OFDM, but the embodiments of the present disclosure are not limited thereto.

As another optional embodiment, the transmission scheme of the first channel can include MSC of the first channel. Optionally, in the embodiments of the present disclosure, for the same indication information, different channel priorities can be corresponding to different MSCs; that is to say, if the MSC indication information indicates MCS=k, then the MSC corresponding to MCS=k can be changed with the channel priority. In such a case, if the first channel is a data channel, then the terminal device can further determine a MCS corresponding to the MSC indication information in the DCI configured to schedule the first channel according to the channel priority of the first channel.

As an optional example, if the channel priority of the first channel is 0, then the MCS indication information can be corresponding to a fixed MCS, and can be applied to mMTC business; if the channel priority of the first channel is 1, then the MCS indication information can be corresponding to MSC of Quadrature Phase Shift Keyin (QPSK) or 16 Quadrature Amplitude Modulation (QAM), and can be applied to URLLC business to ensure the reliability; if the channel priority of the first channel is 2, then the MCS indication information can be corresponding to MSC of QPSK, 16QAM or 64QAM, and can be applied to eMBB business to ensure the transmission efficiency. For example, in case that the MSC indication information is 101, if the channel priority of the first channel is 0, then the MSC indicated by the MSC indication information is QPSK; if the channel priority of the first channel is 1, then the MSC indicated by the MSC indication information is 16QAM; if the channel priority of the first channel is 2, then the MSC indicated by the MSC indication information is 64QAM; but the embodiments of the present disclosure are not limited thereto.

As another optional embodiment, the transmission scheme of the first channel can include a retransmission scheme of the first channel, for example, whether to perform continuous, multiple times of retransmission and/or the number of the retransmission, and the like. In an optional example, in case that the first channel is a data channel, if the channel priority of the first channel is 0, then the terminal device can continuously transmit the first channel for multiple times in which different transmissions can be corresponding to different redundancy versions; if the channel priority of the first channel is 1, then the terminal device can only transmit the first channel for one time. In this way, for the business having higher requirements on the reliability, the reliability of the transmission can be ensured by multiple times of retransmissions.

As another optional embodiment, the transmission scheme of the first channel can include a precoding scheme of the first channel, for example, single port transmission, transmission diversity, spatial multiplexing, open loop precoding, quasi-open loop precoding or closed loop precoding, and the like, without particularly limited in the embodiments of the present disclosure. For example, when the channel priority of the first channel is 0, the precoding scheme of the first channel can be transmission diversity; otherwise, the precoding scheme of the first channel can be spatial multiplexing. In the embodiments of the present disclosure, optionally, the business type having higher requirements on the reliability can be configured with higher channel priority and can utilize lower-level precoding scheme; the business type having higher requirements on the transmission efficiency can be configured with lower channel priority and can utilize higher-level precoding scheme, so as to satisfy the demands from different business types.

As another optional embodiment, the transmission scheme of the first channel can include a Cyclic Prefix (CP) type of the first channel, for example, a normal CP or an extended CP. For example, when the first channel has a lower channel priority, a normal CP can be used; when the first channel has a higher channel priority, an extended CP can be used, but the embodiments of the present disclosure are not limited thereto.

As another optional embodiment, if the first channel is a periodically transmitted channel, then the transmission scheme of the first channel can include a transmission periodicity of the first channel. For example, if the channel priority of the first channel is 0, then the first channel can have a shorter transmission periodicity; if the channel priority of the first channel is 1, then the first channel can have a longer transmission periodicity, but the embodiments of the present disclosure are not limited thereto.

As another optional embodiment, if the first channel is a data channel, then the transmission scheme of the first channel can include a transmission timing of the first channel. Optionally, the transmission timing of the first channel can include a time interval between the first channel and the DCI configured to schedule the first channel, that is, the number of time domain resource unit spaced between the time domain resource occupied by the DCI and the time domain resource occupied by the first channel; or, the transmission timing of the first channel can also include a HARQ sequence between the first channel and the corresponding ACK/NACK, that is, the number of time domain resource unit spaced between the time domain resource occupied by the first channel and the time domain resource occupied by the corresponding ACK/NACK feedback; the time domain resource unit herein can be time slot, sub-frame, mini-time slot or OFDM symbol, without particularly limited in the embodiments of the present disclosure.

As another optional embodiment, if the first channel is a data channel, then the transmission scheme of the first channel can include a HARQ combining mode of the first channel, for example, Chase Combine (CC) or Incremental Redundancy (IR), and the like, without particularly limited in the embodiments of the present disclosure.

As another optional embodiment, if the first channel is a data channel, then the transmission scheme of the first channel can include a Demodulation Reference Signal (DMRS) pattern of the first channel. Optionally, a plurality of DMRS patterns can be predefined or preconfigured, and transmissions of channels with different channel priorities can utilize different DMRS patterns so as to achieve different channel estimation performances. Different DMRS patterns can have different pilot RE densities, the pilot RE can be configured to carry the DMRS. Optionally, the business type having higher requirements on the reliability can be configured with higher channel priority and can use DMRS pattern having greater pilot RE density, the business type having higher requirements on the transmission efficiency can be configured with lower channel priority and can use DMRS pattern having smaller pilot RE density, so as to reduce the pilot overheads, and hence to satisfy the demands from different business types.

As another optional embodiment, if the first channel is an uplink data channel, then the transmission scheme of the first channel can include a transmission power of the first channel. Optionally, if the terminal device needs to transmit the first channel and a second channel to the network device at the same time and if a sum of current transmission powers of the first channel and the second channel is larger than a maximum transmission power of the terminal device, then the terminal device can determine a target transmission power of the first channel according to the channel priority of the first channel and transmit the first channel by using the target transmission power. The target transmission power of the first channel can be smaller than or equal to the current transmission power of the first channel. Optionally, the current transmission power of the first channel can be determined by the terminal device according to an agreed, uplink power control process. As an optional example, when the sum of transmission powers of the first channel and other uplink channel(s) required to be transmitted at the same time by the terminal device is larger than the maximum transmission power of the terminal device, the terminal device can determine whether to reduce the transmission power of the first channel by comparing the channel priority of the first channel with the channel priority of the other uplink channel or by comparing the channel priority of the first channel with a priority threshold. For example, if the first channel has lower channel priority, then the terminal device can reduce the transmission power of the first channel. Optionally, the transmission power of the first channel can be reduced to 0, in such a case the terminal device may not transmit the first channel, but the embodiments of the present disclosure are not limited thereto. Optionally, if the first channel has higher channel priority, then the terminal device may not reduce the transmission power of the first channel but still use the current transmission power. In this way, under the circumstance of limited transmission power, it can give priority to ensure the transmission performance of the data or business having higher priority, so as to satisfy the demands from the data and business having higher priority.

Optionally, the terminal device can further determine a maximum permitted transmission power or a power boosting value of the first channel according to the channel priority of the first channel, and the power boosting value of the first channel can be used by the terminal device for determining the transmission power of the first channel. In this way, it can give priority to ensure the transmission performance of the data or business having higher priority by improving the transmission power, so as to satisfy the demands from the data and business having higher priority.

As another optional embodiment, if the first channel is an uplink channel, then the transmission scheme of the first channel can include a resource conflict processing mode of the first channel, that is, a processing mode used in case that the transmission of the first channel is conflicted with the transmission of other channel in resource. The resource confliction herein can refer to that a physical resource for transmitting the first channel has an overlap with a physical resource for transmitting other channel, and can also refer to the case where the first channel uses a transmission scheme different from (e.g., different multi-access scheme or different subcarrier space) that of other channel and needs to be transmitted on a same time domain resource or a same frequency domain resource, but the capacity of the terminal device cannot support such transmission mechanism, without particularly limited in the embodiments of the present disclosure.

Optionally, when the physical resource of the first channel is conflicted with the physical resource of other channel (e.g., a third channel), it can determine whether to transmit the first channel on the conflicted physical resource according to the channel priority of the first channel.

Optionally, the terminal device can determine whether to transmit the first channel on the conflicted physical resource by comparing the channel priority of the first channel with the channel priority of the other channel (i.e., a third channel). In an exemplary embodiment, if the channel priority of the first channel is not lower than that of other channel which is conflicted with the first channel in physical resource, then the terminal device can give priority to transmit the first channel on the conflicted physical resource; otherwise, the terminal device can discard the information carried by the first channel on the conflicted physical resource or can perform a rate matching to the first channel. In this way, when a resource confliction is occurred, it can give priority to transit the business having higher requirements on time delay and reliability, so as to satisfy the corresponding demands. For example, in case that the first channel is a Physical Uplink Control Channel (PUCCH), when the first channel is conflicted with other PUCCH in resource, it can give priority to transmit the information carried on the PUCCH having higher channel priority, and can discard the control information carried on the PUCCH having lower priority which can no longer be carried, by taking the channel priorities of the channels as an information discarding rule, so as to ensure the transmission of the control channel having higher priority.

Optionally, the terminal device can also determine whether to transmit the first channel on the conflicted physical source by comparing the channel priority of the first channel with a priority threshold. For example, if the channel priority of the first channel is higher than the priority threshold, then the terminal device can determine to transmit the first channel on the conflicted physical source; otherwise, the terminal device can discard the information carried on the first channel or perform a rate matching to the first channel, but the embodiments of the present disclosure are not limited thereto.

As another optional embodiment, if the first channel is an uplink data channel carried with UCI, then the transmission scheme of the first channel can include a transmission scheme of the UCI contained in the first channel, for example, the number of retransmission of the UCI in the first channel, Resource Element (RE) occupied by the UCI in the first channel, and/or, a channel coding scheme of the UCI and the like, without particularly limited in the embodiments of the present disclosure.

As another optional embodiment, if the first channel is a downlink channel, then the transmission scheme of the first channel can include a hypothetic multiplexing mode of the first channel, and the terminal device can use the hypothetic multiplexing mode for signal detection and/or signal estimation. The hypothetic multiplexing mode can include Single User Multiple Input Multiple Output (SU-MIMO) or Multiple User Multiple Input Multiple Output (MU-MIMO), and the like, without particularly limited in the embodiments of the present disclosure. For example, in case that the first channel is a downlink data channel, if the channel priority of the first channel is 0, then the terminal device can assume that the data channel uses SU-MIMO, and a DMRS resource of the first channel has no other DMRS port; if the channel priority of the first channel is larger than 0, then the terminal device can assume that other multiplexing DMRS port may be present on the DMRS resource of the first channel. In this way, the terminal device can use different detecting algorithms based on different hypothetic multiplexing modes, so as to improve the detecting performance.

As another optional embodiment, if the first channel is a downlink channel, then the transmission scheme of the first channel can include a storage mode of the first channel under decoding failure; that is, the storage mode for the information carried on the first channel when the terminal device fails to successively decode the first channel. In an exemplary embodiment, if the current soft buffer is not sufficient to store the information carried on the first channel, then the terminal device can determine whether to give priority to store the information carried on the first channel according to the channel priority of the first channel. Optionally, when the first channel has lower channel priority, the terminal device can discard the information carried on the first channel, but the embodiments of the present disclosure are not limited thereto.

As another optional embodiment, if the first channel is a downlink data channel, then the transmission method 200 can further include: determining at least one of a transmission scheme and a transmission priority for an ACK/NACK feedback corresponding to the first channel by the terminal device according to the channel priority of the first channel.

Optionally, the transmission scheme of the feedback information can include: whether to perform ACK/NACK bundling, whether to perform retransmission and the like, without particularly limited in the embodiments of the present disclosure. Optionally, when the ACK/NACK feedback of the first channel is conflicted with the ACK/NACK feedback of other data channel, the terminal device can determine the transmission priority of the ACK/NACK corresponding to the first channel according to the channel priority of the first channel, and determine whether to transmit the ACK/NACK of the first channel on this basis. In an exemplary embodiment, the terminal device can compare the channel priority of the first channel with the channel priority of other data channel, or compare the channel priority of the first channel with the priority threshold, so as to determine whether to transmit the ACK/NACK of the first channel. For example, if the first channel has higher channel priority, then it can give priority to discard the ACK/NACK corresponding to the data channel having lower channel priority, so as to give priority to ensure the transmission of the ACK/NACK of the data having higher QoS, but the embodiments of the present disclosure are not limited thereto.

It should be understood that, in the embodiments of the present disclosure, the transmission scheme of the first channel can include one or more of the foregoing examples, without particularly limited in the embodiments of the present disclosure.

In S250, a transmission of the first channel is performed by the terminal device and the network device using the determined transmission scheme.

In an exemplary embodiment, if the first channel is an uplink channel, then the terminal device can use the determined transmission scheme to transmit the first channel; correspondingly, the network device can use the determined transmission scheme to receive the first channel. If the first channel is a downlink channel, then the network device can use the determined transmission scheme to transmit the first channel; correspondingly, the terminal device can use the determined transmission scheme to receive the first channel.

Therefore, in the transmission method provided by the embodiments of the present disclosure, the network device determines the channel priority of the first channel and sends the indication information configured to indicate the channel priority of the first channel to the terminal device; the terminal device and the network device can determine the transmission scheme of the first channel according to the channel priority of the first channel and perform the transmission of the first channel by using the determined transmission scheme, which facilitates transmitting different channels having different channel priorities by using different transmission schemes, so as to satisfy different transmission demands under limited system resource.

Furthermore, in the embodiments of the present disclosure, the terminal device can be aware of the channel priority of the channel to be transmitted currently, so as to transmit the channel by using a corresponding transmission parameter of physical layer, and hence to satisfy the demands from the business corresponding to the channel priority, such as time delay, reliability and throughput, as far as possible.

It should be understood that, the foregoing embodiments are all described with reference to the case where the network device sends indication information to the terminal device to notify the channel priority of the first channel. Optionally, the terminal device can also determine the channel priority of the first channel by other ways, without particularly limited in the embodiments of the present disclosure.

It should also be understood that, the magnitudes of the sequence numbers used in the foregoing processes are not intended to imply any sequential order of performing these processes, and the sequential order of performing these processes should be determined by functions and internal logics thereof, without constituting any limitation to the implementation of the embodiments of the present disclosure.

In the foregoing, the transmission method according to the embodiments of the present disclosure has been described in details in conjunction with FIG. 1 to FIG. 2. Hereinafter, a transmission device according to the embodiments of the present disclosure will be described in details in conjunction with FIG. 3 to FIG. 6.

Figure 3:
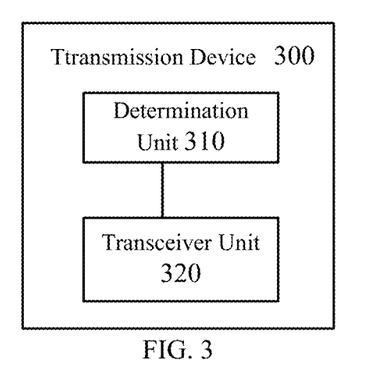
FIG. 3 is a block diagram illustrating a transmission device provided by an embodiment of the present disclosure.

FIG. 3 illustrates a transmission device 300 provided by an embodiment of the present disclosure. The transmission device 300 includes a determination unit 310 and a transceiver unit 320.

The determination unit 310 is configured to determine a channel priority of a first channel and determine a transmission scheme of the first channel according to the channel priority of the first channel.

The transceiver unit 320 is configured to perform a transmission of the first channel by using the transmission scheme determined by the determination unit 310.

Optionally, the first channel is a data channel. In such a case, the determination unit 310 can be configured to determine the channel priority of the first channel according to DCI sent from a network device; the DCI is configured to schedule the transmission of the first channel.

Optionally, the determination unit 310 can be configured to:

determine the channel priority of the first channel according to priority indication information contained in the DCI, the priority indication information is used to indicate the channel priority of the first channel; or, determine the channel priority of the first channel according to a DCI format of the DCI; or, determine the channel priority of the first channel according to a scrambling sequence of a cyclic redundancy check (CRC) code of the DCI; or determine the channel priority of the first channel according to a control channel resource occupied by the DCI; or determine the channel priority of the first channel according to transmission timing indication information contained in the DCI, wherein the transmission timing indication information is used to indicate a time interval between the DCI and the first channel, and/or, a HARQ sequence between the first channel and an ACK/NACK feedback corresponding to the first channel; or, determine the channel priority of the first channel according to transmission duration indication information contained in the DCI, wherein the transmission duration indication information is used to indicate a length of time domain resource occupied by the first channel.

Optionally, if the first channel is an uplink channel, then the transmission scheme of the first channel can include a transmission power of the first channel. In such a case, the determination unit 310 can be configured to determine a target transmission power of the first channel according to the channel priority of the first channel if the transmission device needs to transmit the first channel at the same time when transmitting a second channel to a network device and if a sum of current transmission powers of the first channel and the second channel is larger than a maximum transmission power of the terminal device; the target transmission power of the first channel is smaller than or equal to the current transmission power of the first channel, and the target transmission power of the first channel is the transmission power to transmit the first channel.

Optionally, if the first channel is an uplink channel, then the transmission scheme of the first channel can include a transmission power of the first channel. In such a case, the determination unit 310 can be configured to:

determine a maximum permitted transmission power or a power boosting value of the first channel according to the channel priority of the first channel; and determine the transmission power of the first channel according to the maximum permitted transmission power or the power boosting value of the first channel.

Optionally, the determination unit 310 can be configured to: determine whether to transmit the first channel on a physical resource of the first channel according to the channel priority of the first channel in case that the first channel is an uplink channel and the physical resource of the first channel is conflicted with a physical resource of a third channel of the transmission device.

Optionally, the determination unit 310 can be configured to:

determine a MCS indicated by MSC indication information contained in DCI according to the channel priority of the first channel if the first channel is a data channel, the DCI is configured to schedule the transmission of the first channel.

Optionally, if the first channel is a downlink data channel, then the determination unit 310 can be configured to: determine at least one of a transmission priority and a transmission scheme for an ACK/NACK feedback of the first channel according to the channel priority of the first channel.

Optionally, the transceiver unit 320 can be further configured to: receive a RRC signaling sent from a network device, before the determination unit 310 determines the transmission scheme of the first channel according to the channel priority of the first channel; the RRC signaling is configured to indicate a correspondence between at least one predetermined channel priority and the transmission scheme. Correspondingly, the determination unit 310 can be configured to determine the transmission scheme of the first channel according to the correspondence indicated by the RRC signaling received by the transceiver unit 320 and the channel priority of the first channel.

In an optional example, those skilled in the art should be understood that, the transmission device 300 can be the terminal device in the foregoing embodiments, and the transmission device 300 can be configured to perform the flows and/or steps corresponding to the terminal device in the foregoing transmission method, which will not be repeated herein for concision.

Figure 4:
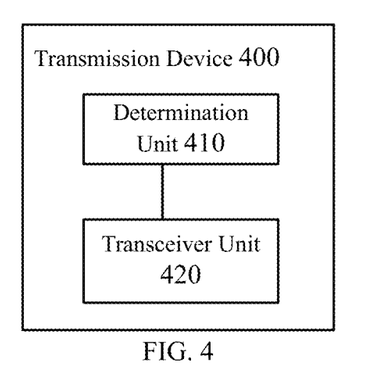
FIG. 4 is a block diagram illustrating another transmission device provided by an embodiment of the present disclosure.

FIG. 4 illustrates another transmission device 400 provided by an embodiment of the present disclosure. The transmission device 400 includes a determination unit 410 and a transceiver unit 420.

The determination unit 410 is configured to determine a channel priority of a first channel according to at least one of a business type and a transmission performance requirement of the first channel.

The transceiver unit 420 is configured to send indication information to a terminal device, wherein the indication information is used to indicate the channel priority of the first channel determined by the determination unit 410.

Optionally, the first channel is a data channel. In such a case, the transceiver unit 420 can be configured to send DCI to the terminal device, and the DCI is configured to schedule a transmission of the first channel.

Optionally, the DCI can include priority indication information configured to indicate the channel priority of the first channel.

Optionally, the determination unit 410 can be further configured to determine a DCI format corresponding to the channel priority of the first channel before the transceiver unit 420 sends the DCI to the terminal device. Correspondingly, the transceiver unit 420 can be configured to send the DCI to the terminal device by using the DCI format determined by the determination unit 410.

Optionally, the determination unit 410 can be further configured to: determine a scrambling sequence corresponding to the channel priority of the first channel before the transceiver unit 420 sends the DCI to the terminal device; and perform a scrambling process to a CRC code of the DCI by using the corresponding scrambling sequence.

Optionally, the determination unit 410 can be further configured to: determine a control channel resource corresponding to the channel priority of the first channel before the transceiver unit 420 sends the DCI to the terminal device. Correspondingly, the transceiver unit 420 can be configured to send the DCI to the terminal device on the control channel resource determined by the determination unit 410.

Optionally, the determination unit 410 can be further configured to: determine a transmission timing corresponding to the channel priority of the first channel before the transceiver unit 420 sends the DCI to the terminal device; the transmission timing corresponding to the first channel includes a time interval between the DCI and the first channel, and/or, a HARQ sequence between the first channel and an ACK/NACK feedback corresponding to the first channel. In such a case, the DCI can include transmission timing indication information configured to indicate the transmission timing.

Optionally, the determination unit 410 can be further configured to: determine a transmission duration corresponding to the channel priority of the first channel before the transceiver unit 420 sends the DCI to the terminal device. In such a case, the DCI can include transmission duration indication information configured to indicate the transmission duration.

Optionally, the determination unit 410 can be further configured to: determine a transmission scheme of the first channel according to the channel priority of the first channel. Correspondingly, the transceiver unit 420 can be further configured to perform a transmission of the first channel by using the determined transmission scheme.

In an optional example, those skilled in the art should be appreciated that, the transmission device 400 can be the network device in the foregoing embodiments, and the transmission device 400 can be configured to perform the flows and/or steps corresponding to the network device in the foregoing transmission method, which will not be repeated herein for concision.

It should be understood that, the transmission device 300 and transmission device 400 herein are embodied in the form of functional units. The term "unit" herein may refer to Application Specific Integrated Circuit (ASIC), electronic circuit, processor (e.g., shared processor, dedicated processor or grouped processor) and memory configured to perform one or more software or firmware program, merged logic circuit and/or other appropriate components which support the described functions.

Figure 5:
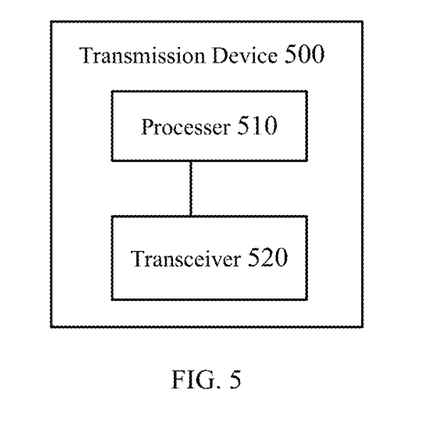
FIG. 5 is a block diagram illustrating yet another transmission device provided by an embodiment of the present disclosure.

FIG. 5 illustrates yet another transmission device 500 provided by an embodiment of the present disclosure. The transmission device 500 includes a processor 510 and a transceiver 520.

The processor 510 is configured to determine a channel priority of a first channel and determine a transmission scheme of the first channel according to the channel priority of the first channel.

The transceiver 520 is configured to perform a transmission of the first channel by using the transmission scheme determined by the processor 510.

Optionally, the first channel is a data channel. In such a case, the processor 510 can be configured to determine the channel priority of the first channel according to DCI sent from a network device; the DCI is configured to schedule the transmission of the first channel.

Optionally, the processor 510 can be configured to:

determine the channel priority of the first channel according to priority indication information contained in the DCI, wherein the priority indication information is used to indicate the channel priority of the first channel; or, determine the channel priority of the first channel according to a DCI format of the DCI; or, determine the channel priority of the first channel according to a scrambling sequence of a cyclic redundancy check (CRC) code of the DCI; or determine the channel priority of the first channel according to a control channel resource occupied by the DCI; or determine the channel priority of the first channel according to transmission timing indication information contained in the DCI, wherein the transmission timing indication information is used to indicate a time interval between the DCI and the first channel, and/or, a HARQ sequence between the first channel and an ACK/NACK corresponding to the first channel; or, determine the channel priority of the first channel according to transmission duration indication information contained in the DCI, wherein the transmission duration indication information is used to indicate a length of time domain resource occupied by the first channel.

Optionally, if the first channel is an uplink channel, then the transmission scheme of the first channel can include a transmission power of the first channel. In such a case, the processor 510 can be configured to determine a target transmission power of the first channel according to the channel priority of the first channel if the transmission device needs to transmit the first channel at the same time when transmitting a second channel to a network device and if a sum of current transmission powers of the first channel and the second channel is larger than a maximum transmission power of the terminal device; the target transmission power of the first channel is smaller than or equal to the current transmission power of the first channel, and the target transmission power of the first channel is the transmission power to transmit the first channel.

Optionally, if the first channel is an uplink channel, then the transmission scheme of the first channel can include a transmission power of the first channel. In such a case, the processor 510 can be configured to:

determine a maximum permitted transmission power or a power boosting value of the first channel according to the channel priority of the first channel; and determine the transmission power of the first channel according to the maximum permitted transmission power or the power boosting value of the first channel.

Optionally, the processor 510 can be configured to: determine whether to transmit the first channel on a physical resource of the first channel according to the channel priority of the first channel in case that the first channel is an uplink channel and the physical resource of the first channel is conflicted with a physical resource of a third channel of the transmission device.

Optionally, the processor 510 can be configured to:

determine a MCS indicated by MSC indication information contained in DCI according to the channel priority of the first channel if the first channel is a data channel, the DCI is configured to schedule the transmission of the first channel.

Optionally, if the first channel is a downlink data channel, then the processor 510 can be further configured to: determine at least one of a transmission priority and a transmission scheme for an ACK/NACK of the first channel according to the channel priority of the first channel.

Optionally, the transceiver 520 can be further configured to: receive a RRC signaling sent from a network device, before the processor 510 determines the transmission scheme of the first channel according to the channel priority of the first channel; the RRC signaling is configured to indicate a correspondence between at least one predetermined channel priority and the transmission scheme. Correspondingly, the processor 510 can be configured to determine the transmission scheme of the first channel according to the correspondence indicated by the RRC signaling received by the transceiver 520 and the channel priority of the first channel.

In an optional example, those skilled in the art should be understood that, the transmission device 500 can be the terminal device in the foregoing embodiments, and the transmission device 500 can be configured to perform the flows and/or steps corresponding to the terminal device in the foregoing transmission method, which will not be repeated herein for concision.

Optionally, the transmission device 500 can further include a memory. The memory can include read-only memory (ROM) and random access memory (RAM), and can provide the processor with instruction and data. A part of the memory can also include nonvolatile RAM. For example, the memory can also store information of device type. The processor 510 can be configured to perform the instruction stored in the memory, and when the processor performs the instruction, it can perform the steps corresponding to the terminal device in the foregoing transmission method.

Figure 6:
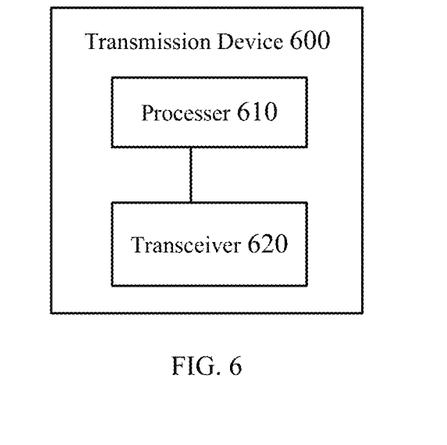
FIG. 6 is a block diagram illustrating further another transmission device provided by an embodiment of the present disclosure.

FIG. 6 illustrates further another transmission device 600 provided by an embodiment of the present disclosure. The transmission device 600 includes a processor 610 and a transceiver 620.

The processer 610 is configured to determine a channel priority of a first channel according to at least one of a business type and a transmission performance requirement of the first channel.

The transceiver 620 is configured to send indication information to a terminal device, wherein the indication information is used to indicate the channel priority of the first channel determined by the processor 610.

Optionally, the first channel is a data channel. In such a case, the transceiver 620 can be configured to send DCI to the terminal device, and the DCI is configured to schedule a transmission of the first channel.

Optionally, the DCI can include priority indication information configured to indicate the channel priority of the first channel.

Optionally, the processor 610 can be further configured to determine a DCI format corresponding to the channel priority of the first channel before the transceiver 620 sends the DCI to the terminal device. Correspondingly, the transceiver 620 can be configured to send the DCI to the terminal device by using the DCI format determined by the processor 610.

Optionally, the processor 610 can be further configured to: determine a scrambling sequence corresponding to the channel priority of the first channel before the transceiver 620 sends the DCI to the terminal device; and perform a scrambling process to a CRC code of the DCI by using the corresponding scrambling sequence.

Optionally, the processor 610 can be further configured to: determine a control channel resource corresponding to the channel priority of the first channel before the transceiver 620 sends the DCI to the terminal device. Correspondingly, the transceiver 620 can be configured to send the DCI to the terminal device on the control channel resource determined by the processor 610.

Optionally, the processor 610 can be further configured to: determine a transmission timing corresponding to the channel priority of the first channel before the transceiver 620 sends the DCI to the terminal device; the transmission timing corresponding to the first channel includes a time interval between the DCI and the first channel, and/or, a HARQ sequence between the first channel and an ACK/NACK corresponding to the first channel. In such a case, the DCI can include transmission timing indication information configured to indicate the transmission timing.

Optionally, the processor 610 can be further configured to: determine a transmission duration corresponding to the channel priority of the first channel before the transceiver 620 sends the DCI to the terminal device. In such a case, the DCI can include transmission duration indication information configured to indicate the transmission duration.

Optionally, the processor 610 can be further configured to: determine a transmission scheme of the first channel according to the channel priority of the first channel. Correspondingly, the transceiver 620 can be further configured to perform a transmission of the first channel by using the determined transmission scheme.

In an optional example, those skilled in the art should be appreciated that, the transmission device 600 can be the network device in the foregoing embodiments, and the transmission device 600 can be configured to perform the flows and/or steps corresponding to the network device in the foregoing transmission method, which will not be repeated herein for concision.

Optionally, the transmission device 600 can further include a memory. The memory can include read-only memory (ROM) and random access memory (RAM), and can provide the processor with instruction and data. A part of the memory can also include nonvolatile RAM. For example, the memory can also store information of device type. The processor 610 can be configured to perform the instruction stored in the memory, and when the processor performs the instruction, it can perform the steps corresponding to the network device in the foregoing embodiments of transmission method.

It should be understood that, in the embodiments of the present disclosure, the processor can be Central Processing Unit (CPU), and the processor can also be other general processer, Digital Signal Processer (DSP), Application Specific Integrated Circuit (ASIC), Field-programmable Gate Array (FPGA) or other Programmable Logic Device (PLD), discrete gate device or transistor logic device, discrete hardware component and the like. The general processor can be a microprocessor, or the processor can be any normal processor and the like.

During implementation, steps in the foregoing transmission method can be achieved by an integrated logic circuit of hardware or an instruction in a form of software in the processor. The steps of the transmission method disclosed in conjunction with the embodiments of the present disclosure can be directly achieved by a hardware processer, or achieved by a combination of hardware module with software module in the processor. The software module can be located in matured storage mediums in the art such as RAM, flash memory, ROM, Programmable read-only memory (FPROM), Electrically Erasable Programmable Read-Only Memory (EEPROM) and register. The storage medium is located in the memory, and the processor performs the instruction in the memory so as to achieve the steps in the foregoing transmission method in combination with the hardware thereof. In order to avoid repetition, the description of details will be omitted herein.

It should also be understood that, the term "channel priority" in the embodiments of the present disclosure can also be referred to as transmission power priority, transmission priority, HARQ priority, time delay priority or reliability priority depending on its purpose, which should not constitute any limitation to the embodiments of the present disclosure.

It should also be understood that, in the embodiments of the present disclosure, the transmission scheme of the first channel can also be interpreted as the transmission scheme of the information carried on the first channel. For example, the channel coding scheme of the first channel can also be the channel coding scheme of the information carried on the first channel, the MCS of the first channel can also be the MCS of the information carried on the first channel, the precoding scheme of the first channel can also be the precoding scheme of the information carried on the first channel, the information storage scheme of the first channel under decoding failure can also be the information storage scheme of the information carried on the first channel under decoding failure, and the like.

It should also be understood that, the terms "system" and "network" as used in the present disclosure can be exchanged with each other. The term "and/or" used in the present disclosure merely refers to a correlation relationship between the correlated objects, and indicates there can be three types of relationships. For example, A and/or B can indicate the following three conditions: only A is present, both of A and B are present, only B is present. Furthermore, the symbol "/" used in the present disclosure usually indicates a relationship of "or" between the correlated objects before and after this symbol.

Those ordinary skilled in the art should be appreciated that, the method steps and units described in conjunction with the embodiments disclosed by the present disclosure can be implemented in electronic hardware, computer software or a combination thereof. In order to clearly explain that the hardware and the software can be exchanged with each other, steps and constitutions of the embodiments have been generally described in the foregoing description according to the functions. Whether these functions are to be performed in the form of hardware or software is depending on specific applications and constraint conditions for design of the technical solutions. Those ordinary skilled in the art can use different method for each of the specific applications so as to achieve the described functions, but such implementation should not be considered as going beyond the scope of the present disclosure.

Those skilled pertaining to the art will be clearly appreciated that, in order for convenience and concision of explanation, particular working processes of the system(s), device(s) and unit(s) described above can be referred to corresponding processes in the foregoing embodiments of the transmission method without repeating herein.

In several embodiments provided by the present disclosure, it should be understood that, the revealed system(s), device(s) and method(s) can be implemented in other ways. For example, the foregoing embodiments of the transmission method are merely illustrative. For example, the partition of the units merely is a partition in terms of logic functions, and there can be other partitions in practical implementation. For example, multiple units or components can be combined or integrated into another system, or some features can be omitted or may not be performed. Furthermore, the terms "coupling", "direct coupling" or "communication connection" as revealed or discussed between objects can be indirect coupling or communication connection through several ports, devices or units, and can also be electric connection, mechanic connection or other forms of connection.

The units described as separate parts may or may not be separated physically. The part present as a unit may or may not be a physical unit, that is, it can be located in a single position or can be distributed in multiple network units. Part or all of the units can be selected according to actual demands, so as to achieve the objective of the technical solutions of the present disclosure.

Furthermore, the functional units in the embodiments of the present disclosure can be integrated in a single processing unit, and can also be present separately and physically, and can also be the case where two or more than two units are integrated in one unit. The units that are integrated can be implemented in a form of hardware, and can also be implemented in a form of software functional unit.

The integrated unit, when implemented in a form of software functional unit and marketed or used as an independent product, can be stored in a computer-readable storage medium. Based on such understanding, the essence of the technical solutions of the present disclosure or a part of the technical solutions contributing to the existing technology, or all of or part of the technical solutions can be embodied in a form of software product. The software product is stored in a storage medium, including several instructions to cause a computer device (the computer device can be a personal computer, a server or a network device) to perform all or part of the steps of the transmission method described in the embodiments of the present disclosure. Furthermore, the foregoing storage medium includes various types of mediums which can store program codes, for example, USB flash disk, mobile Hard Disk Drive (HDD), Read-Only Memory (ROM), Random Access Memory (RAM), magnetic disk, optical disk and the like.

The above are merely specific implementations of the present disclosure without limiting the protection scope of the present disclosure thereto. Within the technical scope revealed in the present disclosure, modification(s) or substitution(s) may be easily conceivable for those skilled who are familiar with the present technical field, and these modification(s) and substitution(s) all should be contained in the protection scope of the present disclosure. Therefore the protection scope of the present disclosure should be based on the protection scope of the appended claims.

What is claimed is:

1. A transmission method, comprising:
   determining, by a terminal device, a channel priority of a first channel according to a scrambling sequence of a cyclic redundancy check (CRC) code of downlink control information (DCI), wherein the DCI is configured to schedule the transmission of the first channel;
   determining, by the terminal device, a transmission scheme of the first channel according to the channel priority of the first channel; and
   performing, by the terminal device, a transmission of the first channel using the determined transmission scheme,
   wherein determining, by the terminal device, a transmission scheme of the first channel according to the channel priority of the first channel comprises:
     determining whether to transmit the first channel on a physical resource of the first channel according to the channel priority of the first channel in case that the physical resource of the first channel is conflicted with a physical resource of a third channel of the terminal device.

2. The transmission method according to claim 1, wherein the first channel is a data channel or a control channel.

3. The transmission method according to claim 1, wherein the transmission scheme of the first channel comprises at least one of: a channel coding scheme of the first channel; a transmission duration of the first channel; a multi-access scheme of the first channel; a modulation and coding scheme (MCS) of the first channel, a retransmission scheme of the first channel, a transmission power of the first channel; a demodulation reference signal (DMRS) pattern of the first channel; a precoding scheme of the first channel; a hypothetic multiplexing mode of the first channel; a resource conflict processing mode of the first channel; a transmission periodicity of the first channel; an information storage scheme of the first channel under decoding failure; a transmission format of uplink control information in the first channel; a transmission timing of the first channel; and a cyclic prefix (CP) type of the first channel.

4. The transmission method according to claim 1, wherein if the first channel is an uplink channel, then the transmission scheme of the first channel comprises a transmission power of the first channel; and
   determining, by the terminal device, a transmission scheme of the first channel according to the channel priority of the first channel comprises:
     determining, by the terminal device, a target transmission power of the first channel according to the channel priority of the first channel if the terminal device needs to transmit the first channel at the same time when transmitting a second channel to a network device and if a sum of current transmission powers of the first channel and the second channel is larger than a maximum transmission power of the terminal device, wherein the target transmission power of the first channel is smaller than or equal to the current transmission power of the first channel, and the target transmission power of the first channel is the transmission power to transmit the first channel.

5. The transmission method according to claim 1, wherein if the first channel is an uplink channel, then the transmission scheme of the first channel comprises a transmission power of the first channel; and determining, by the terminal device, a transmission scheme of the first channel according to the channel priority of the first channel comprises:

determining, by the terminal device, a maximum permitted transmission power or a power boosting value of the first channel according to the channel priority of the first channel; and determining, by the terminal device, the transmission power of the first channel according to the maximum permitted transmission power or the power boosting value of the first channel.

6. The transmission method according to claim 1, wherein determining, by the terminal device, a transmission scheme of the first channel according to the channel priority of the first channel comprises:

determining whether to transmit the first channel on the physical resource of the first channel according to the channel priority of the first channel in case that the first channel particularly is an uplink channel and the physical resource of the first channel is conflicted with the physical resource of the third channel of the terminal device.

7. The transmission method according to claim 1, wherein determining, by the terminal device, a transmission scheme of the first channel according to the channel priority of the first channel comprises:

determining, by the terminal device, a modulation and coding scheme (MCS) indicated by MSC indication information contained in the DCI according to the channel priority of the first channel if the first channel is a data channel.

8. The transmission method according to claim 1, wherein if the first channel is a downlink data channel, then the transmission method further comprises:

determining, by the terminal device, at least one of a transmission priority and a transmission scheme for an ACK/NACK feedback of the first channel according to the channel priority of the first channel.

9. The transmission method according to claim 1, wherein before determining, by the terminal device, a transmission scheme of the first channel according to the channel priority of the first channel, the transmission method further comprises:

receiving, by the terminal device, a wireless resource control (RRC) signaling sent from a network device, the RRC signaling being configured to indicate a correspondence between at least one predetermined channel priority and a transmission scheme; and wherein determining, by the terminal device, a transmission scheme of the first channel according to the channel priority of the first channel comprises: determining, by the terminal device, the transmission scheme of the first channel according to the correspondence and the channel priority of the first channel.

10. The transmission method according to claim 1, wherein the first channel is an uplink transmission channel or a downlink transmission channel.

11. A transmission device, comprising:
a processor; and
a transceiver;
wherein the processor is configured to:
determine a channel priority of a first channel according to a scrambling sequence of a cyclic redundancy check (CRC) code of downlink control information (DCI), the DCI is configured to schedule the transmission of the first channel; and
determine a transmission scheme of the first channel according to the channel priority of the first channel;
the processor is configured to make the transceiver to perform a transmission of the first channel by using the determined transmission scheme; and
the processor is further configured to:
determine whether to transmit the first channel on a physical resource of the first channel according to the channel priority of the first channel in case that the physical resource of the first channel is conflicted with a physical resource of a third channel of the transmission device.

12. The transmission device according to claim 11, wherein:
the first channel is a data channel or a control channel.

13. The transmission device according to claim 11, wherein the transmission scheme of the first channel comprises at least one of: a channel coding scheme of the first channel; a transmission duration of the first channel; a multi-access scheme of the first channel; a modulation and coding scheme (MCS) of the first channel, a retransmission scheme of the first channel, a transmission power of the first channel; a demodulation reference signal (DMRS) pattern of the first channel; a precoding scheme of the first channel; a hypothetic multiplexing mode of the first channel; a resource conflict processing mode of the first channel; a transmission periodicity of the first channel; an information storage scheme of the first channel under decoding failure; a transmission format of uplink control information in the first channel; a transmission timing of the first channel; and a cyclic prefix (CP) type of the first channel.

14. The transmission device according to claim 11, wherein:
if the first channel is an uplink channel, then the transmission scheme of the first channel comprises a transmission power of the first channel; and
the processor is further configured to determine a target transmission power of the first channel according to the channel priority of the first channel if the transmission device needs to transmit the first channel at the same time when transmitting a second channel to a network device and if a sum of current transmission powers of the first channel and the second channel is larger than a maximum transmission power of the transmission device, wherein the target transmission power of the first channel is smaller than or equal to the current transmission power of the first channel, and the target transmission power of the first channel is the transmission power to transmit the first channel.

15. The transmission device according to claim 11, wherein:
if the first channel is an uplink channel, then the transmission scheme of the first channel comprises a transmission power of the first channel; and
the processor is further configured to:

determine a maximum permitted transmission power or a power boosting value of the first channel according to the channel priority of the first channel; and determine the transmission power of the first channel according to the maximum permitted transmission power or the power boosting value of the first channel.

16. The transmission device according to claim 11, wherein the processor is further configured to:

determine whether to transmit the first channel on the physical resource of the first channel according to the channel priority of the first channel in case that the first channel particularly is an uplink channel and the physical resource of the first channel is conflicted with the physical resource of the third channel of the transmission device.

17. The transmission device according to claim 11, wherein the processor is further configured to:

determine a modulation and coding scheme (MCS) indicated by MSC indication information contained in the DCI according to the channel priority of the first channel if the first channel is a data channel.

18. The transmission device according to claim 11, wherein if the first channel is a downlink data channel, then the processor is further configured to:

determine at least one of a transmission priority and a transmission scheme for an ACK/NACK feedback of the first channel according to the channel priority of the first channel.

19. The transmission device according to claim 11, wherein:

the processor is further configured to make the transceiver to receive a wireless resource control (RRC) signaling sent from a network device, before the processor determines the transmission scheme of the first channel according to the channel priority of the first channel, wherein the RRC signaling is configured to indicate a correspondence between at least one predetermined channel priority and the transmission scheme; and the processor is configured to determine the transmission scheme of the first channel according to the correspondence indicated by the received RRC signaling and the channel priority of the first channel.

20. The transmission device according to claim 11, wherein the first channel is an uplink transmission channel or a downlink transmission channel.

* * * * *